Figure 1:
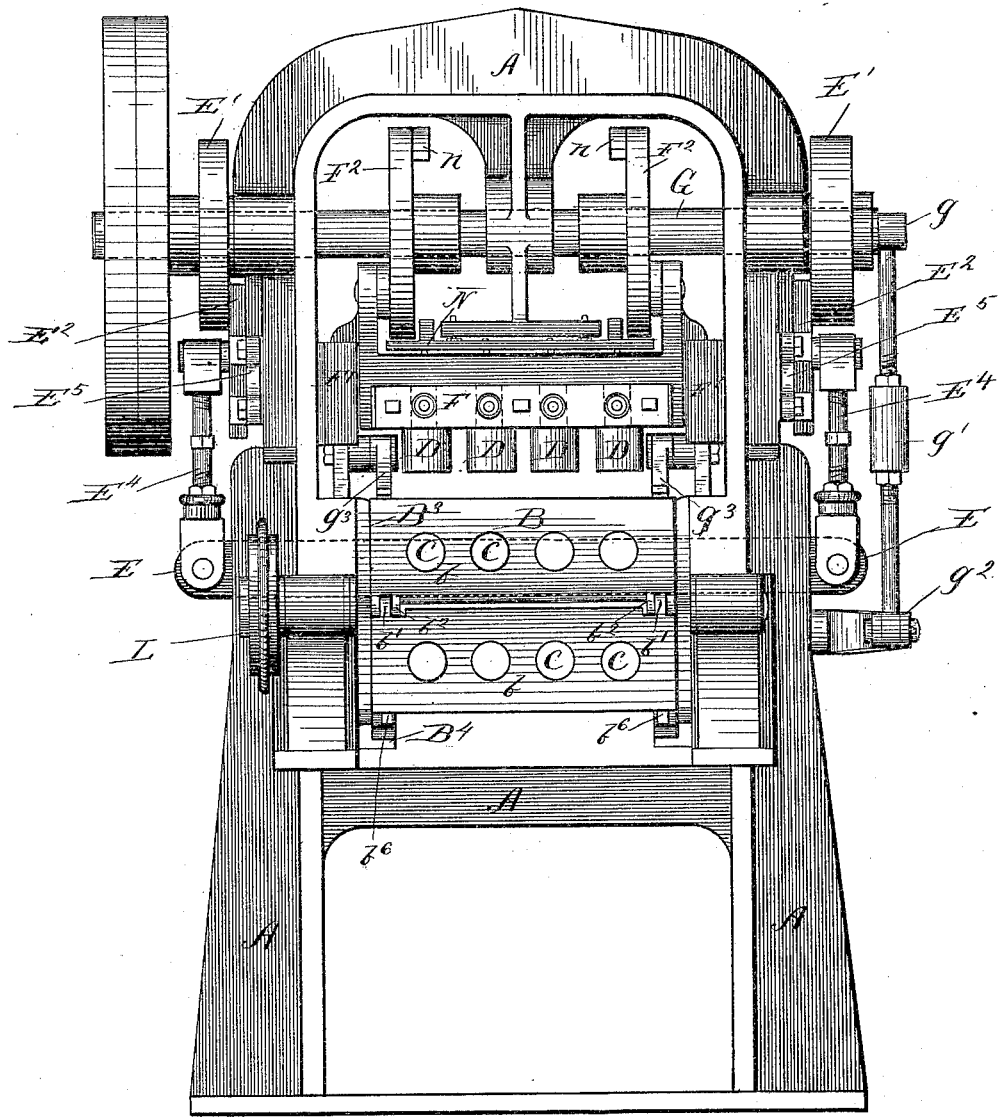

(No Model.) 3 Sheets—Sheet 1.

J. G. HODGSON & E. NORTON.
MACHINE FOR HEMMING CAN CAPS WITH SHEET SOLDER RINGS.

No. 408,317. Patented Aug. 6, 1889.

Witnesses:
Lew. E. Curtis
H. M. Munday

Inventors:
Edwin Norton
John G. Hodgson
By Munday, Evarts & Adcock
their Attorneys

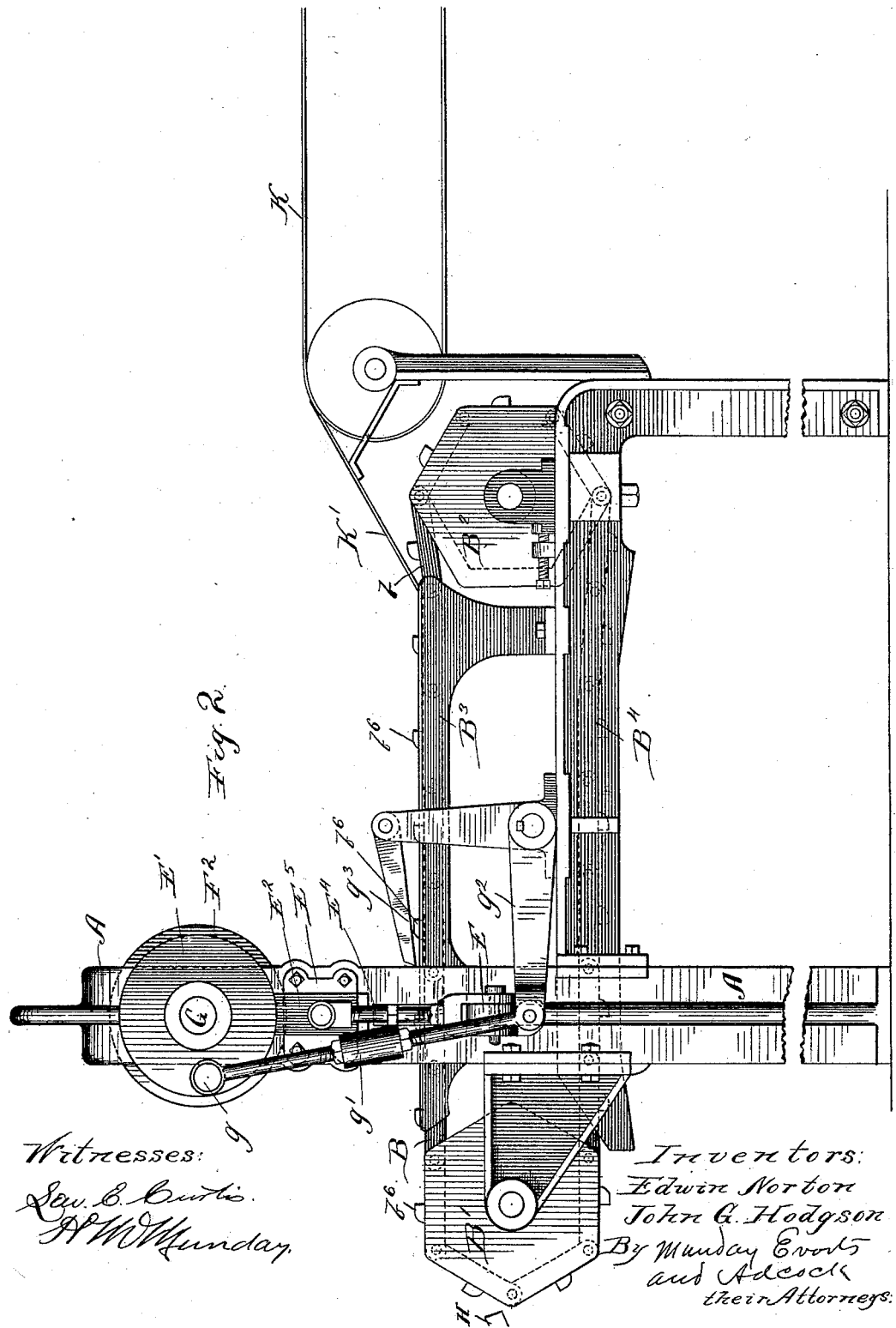

(No Model.) 3 Sheets—Sheet 3.
J. G. HODGSON & E. NORTON.
MACHINE FOR HEMMING CAN CAPS WITH SHEET SOLDER RINGS.
No. 408,317. Patented Aug. 6, 1889.
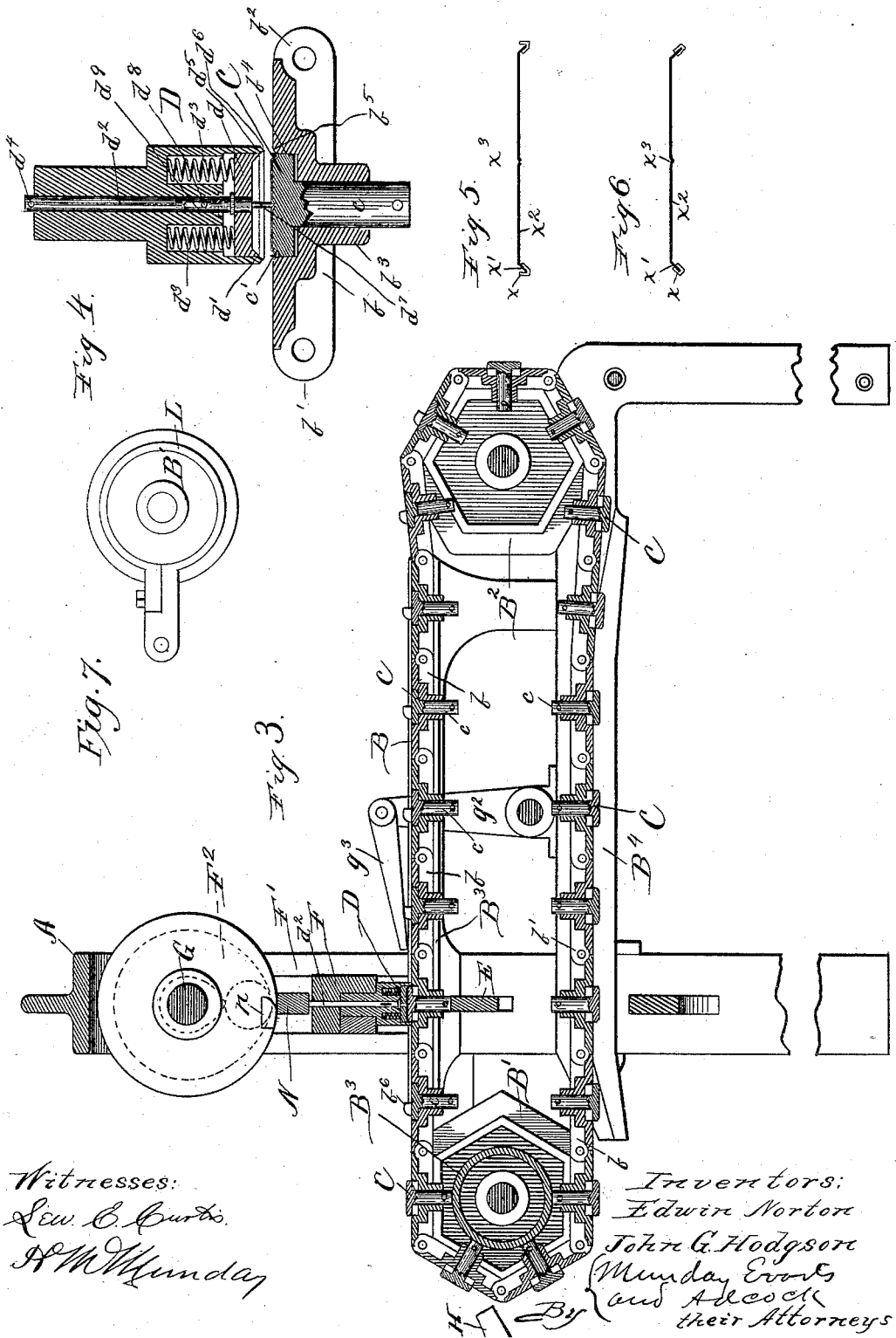
Witnesses:
Geo. E. Curtis.
H. M. Munday
Inventors:
Edwin Norton
John G. Hodgson
By Munday Evarts and Adcock
their Attorneys

UNITED STATES PATENT OFFICE.

JOHN G. HODGSON AND EDWIN NORTON, OF MAYWOOD, ASSIGNORS TO SAID EDWIN NORTON, AND OLIVER W. NORTON, OF CHICAGO, ILLINOIS.

MACHINE FOR HEMMING CAN-CAPS WITH SHEET-SOLDER RINGS.

SPECIFICATION forming part of Letters Patent No. 408,317, dated August 6, 1889.

Application filed October 15, 1888. Serial No. 288,055. (No model.)

*To all whom it may concern:*

Be it known that we, JOHN G. HODGSON and EDWIN NORTON, citizens of the United States, residing at Maywood, in the county of Cook and State of Illinois, have invented a new and useful Improvement in Machines for Hemming Can-Caps with Sheet-Solder Rings, of which the following is a specification.

Our invention relates to the manufacture of solder-hemmed can-caps, such as are shown in and described in Patent No. 364,662, granted to Edwin Norton June 14, 1887.

The object of our invention is to provide a machine for securing sheet-solder rings to can caps or heads rapidly and cheaply.

To this end our invention consists in the combination of a flexible movable carrier furnished with gangs of dies for holding and supporting the can-caps and their sheet-solder rings and of a corresponding gang of punches operating in conjunction with said dies to simultaneously close the solder rings upon the can-caps. The dies are each mounted movably in the carrier, and are automatically reciprocated or moved to discharge the solder-hemmed caps therefrom. The carrier preferably consists of a link chain mounted upon horizontal rollers or polygon wheels, though it may be of other suitable construction. It is preferable to mount the gangs of female dies upon the carrier and the punches or male dies upon the stationary frame of the machine, as the can-caps and their solder rings may be more conveniently placed in the female than in the male die. By this means the solder rings may be very rapidly and cheaply closed upon the can-caps, as by reason of the several sets of gang-dies on the movable carrier the operators may be placing the caps and rings in one gang of dies while another gang of dies are under the punches, and while the hemmed caps are being discharged from still another gang of dies.

While our combined gang-dies and gang-die carrier is specially designed for closing solder rings upon can-caps, it may, nevertheless, be used for other purposes by simply changing the shape of the dies, as may be required to adapt them to other work.

Our invention also consists in the novel devices and novel combinations of parts and devices herein shown and described, and more particularly pointed out in the claims.

In the accompanying drawings, which form a part of this specification, and in which similar letters of reference indicate like parts, Figure 1 is a front view of a machine embodying our invention. Fig. 2 is a side elevation. Fig. 3 is a longitudinal vertical section. Fig. 4 is an enlarged detail vertical section showing the form of the dies. Fig. 5 is a sectional view showing a can-cap and its solder ring before the latter is closed upon the former by the machine. Fig. 6 is a similar view showing the solder ring securely closed, and Fig. 7 is a detail view of the friction-brake hereinafter mentioned.

In said drawings, A represents the frame of the machine. B is a movable die-carrier, preferably consisting of a link chain mounted on rollers or polygon wheels $B'$ $B^2$. The frame A has guides or ways $B^3$ $B^4$ extending between the polygon wheels for guiding and supporting the flexible die-carrier.

C C are the female dies mounted on the carrier B and preferably arranged in gangs or sets extending transversely across the carrier.

D D are the male dies or punches mounted to reciprocate on the frame of the machine and extending across the machine, so that the gang of male dies will register with the gangs of female dies as each gang is in turn brought into position by the intermittently-moving die-carrier B.

Each link $b$ of the chain-carrier B preferably consists of a cast-metal plate having hinges $b'$ $b^2$ at its side edges, by which it is connected to the adjoining links, and provided with sockets or guides $b^3$ to receive the shanks $c$ of the gang of dies C. The shank $c$ of the die C is adapted to reciprocate in the guide $b^3$, and the link $b$ is furnished with recesses $b^4$, to receive the dies C flush with the upper surface of the link-plate. The die C is furnished with a beveled corner $c'$, which, in conjunction with the wall of the recess $b^4$, forms an annular groove to receive the solder ring $x$ as it fits upon the depending flange $x'$ of the can-cap $x^2$.

E is a reciprocating bar or cross-head, by means of which each gang of dies C is in turn supported to resist the thrust of the opposing dies D when the dies C are brought into position by the carrier B. This bar or cross-head also serves to give the dies C a vertical movement in opposition to the dies D in cases where such movement of the dies C is desirable.

The gang of dies D are secured in a movable head F, which is reciprocated in suitable guides F' on the frame of the machine by cams F² on the driving-shaft G.

The die D has a movable follower or central portion $d$, which is provided with a beveled flange $d'$. The follower $d$ is secured to a sliding stem $d^2$ and rests upon coiled springs $d^3$. A pin $d^4$ holds the stem $d^2$ in place. The outer rim of the die D is inwardly beveled, as shown at $d^5$. As the die D descends, the bevel $d^5$ bends or inclines the upwardly-projecting outer edge of the solder ring $x$ inward over the flange $x'$ of the can-cap. The outer wall of the recess $b^4$ is beveled off, as shown at $b^5$, and the lower edge of the die D is correspondingly beveled, as shown at $d^6$, so that the opposing dies C and D will always accurately register with each other. The stem $d^2$ is made hollow, to receive the extractor-pin $d^7$, which is provided with a pin or projection $d^8$, which extends through a slot $d^9$ in the hollow stem $d^2$. This extractor-pin $d^7$ is furnished with a conical end to fit in the vent-hole $x^2$ of the can-cap. The slot $d^9$ in the stem $d^2$ permits the pin $d^7$ to telescope out of the way when the die D makes its stroke against the opposing die C, and the pin by its own weight serves to disengage the can-cap from the follower $d$ in case the cap should cling thereto. The follower $d$ is actuated by the stem $d^2$, to which it is secured, which stem, impinging against the cam-operated cross-bar N, causes the can-cap, with its solder ring, to be ejected from the die D'.

The reciprocating bar or cross-head E is operated by cams E', which operate the slides E². The slides E² are connected by links E⁴ with the cross-head E. E⁵ are the guides in which the slides E² reciprocate. After the die D descends against the link $b$ the die C is given an upward movement by the bar E, to force the follower $d$ against its seat in the die D and snugly close the solder ring around the flange of the can-cap.

The carrier B is intermittently moved forward after each stroke of the plunger F by means of a crank $g$ on the driving-shaft G, which is connected by a link $g'$ with a bent lever $g^2$, carrying a pawl $g^3$, which engages projections $b^6$ on the carrier B. Any other or equivalent mechanism may, however, be employed for intermittently moving the carrier B. The polygon wheel B' is furnished with a rim or projection B³, against which the inner ends of the die-stems $c$ impinge, so as to force the dies C out of the recesses $b^4$ in the link-plates $b$, and thus discharge the solder-hemmed cap from the die as the same passes around the pulley or wheel B'. A discharge-chute H may receive the caps as they are delivered from the machine.

K represents a conveyer-belt, by which the caps and solder rings after being assembled, as indicated in Fig. 5, are conveyed to the carrier B. A chute K' extends from the belt K to the carrier. As the assembled caps and rings slide down the chute upon the carrier B, one or more attendants on each side of the machine position the caps in the annular grooves or seats of the dies C.

L is a friction-brake, with which the pulley B' is provided to prevent any danger of the carrier being moved too far by the pawl-lever for the gang of dies C to properly register with the gang of opposing dies D.

In the drawings we have shown the dies C and D of a shape suitable for doing one special kind of work; but it is obvious that other suitable forms of dies may be used.

The gang of extractor-stems $d^2$, by which the blanks are ejected from the dies D, are all simultaneously operated by a movable cross-bar N, mounted on the cross-head F. The cross-bar N is operated by the cams or projections $n$ on the cam-wheels F². By this means the ejector-stems $d^2$ are positively operated and without springs, the action of springs being always more or less uncertain. The extractor stem or pins $d^2$ being thus positively operated by revolving cams, the jars and danger incident to causing the ejecting-pins or their operating-bar to impinge against fixed stops on the frame of the machine are entirely avoided, and at the same time a much easier and more efficient and satisfactory action is given to the whole machine.

By combining the intermittently-moving die-carrier with its series of dies with a reciprocating die mounted on the stationary frame of the machine we are enabled to bring the faces of the opposing dies to bear flat and smooth upon the interposed sheet, and thus secure the same perfect action of the dies as has heretofore been done where both the dies are mounted directly upon the stationary frame of the machine.

We claim—

1. The combination, with an intermittently-movable flexible die-carrier furnished with dies, of an opposing reciprocating die and a guide B³, for supporting and guiding said die-carrier, substantially as specified.

2. The combination of an intermittently-movable flexible die-carrier furnished with dies, rollers or wheels upon which said carrier is mounted, and an opposing reciprocating die, substantially as specified.

3. The combination of an intermittently-moving endless link chain die-carrier furnished with dies, rollers upon which it is mounted, and an opposing die, substantially as specified.

4. The combination of a movable die-carrier having independently - movable dies mounted thereon, an opposing die, and means for supporting the dies in said carrier against the thrust of said opposing die, substantially as specified.

5. The combination, with an intermittently-movable die-carrier having independently-movable dies mounted thereon, of an opposing reciprocating die mounted on the frame of the machine and means for automatically moving or reciprocating the dies in said carrier to discharge the work therefrom, substantially as specified.

6. The combination, with an endless link chain die-carrier furnished with independently-movable dies, of rollers upon which said carrier is mounted, one of said rollers being furnished with a projection or rim for moving the dies in said carrier to discharge the work therefrom, substantially as specified.

7. The combination, with an intermittently-moving flexible die-carrier having gangs of dies arranged transversely to its line of movement, of a corresponding gang of opposing reciprocating dies and a guide or way $B^3$, for supporting and guiding said die-carrier, substantially as specified.

8. The combination of an intermittently-movable link chain gang die-carrier having gangs of dies in the links thereof, rollers upon which said carrier is mounted, and an opposing gang of reciprocating dies mounted on the frame of the machine, substantially as specified.

9. The combination, with the gang of reciprocating dies mounted on the frame of the machine, of an intermittently-moving die-carrier furnished with gangs of dies mounted movably thereon and a bar or support to sustain said movably-mounted dies, substantially as specified.

10. The combination, with the gang of dies mounted on the frame of the machine, of an intermittently-moving die-carrier furnished with gangs of dies mounted movably thereon and a movable cross-head or bar for simultaneously actuating the gang of dies on the carrier, substantially as specified.

11. The combination, with an intermittently-moving link-chain die-carrier having gangs of dies mounted movably thereon, of rollers upon which said carrier is mounted, one of said rollers being furnished with rings or projections for simultaneously operating each gang of movable dies to discharge the work therefrom as the same pass around the roller, substantially as specified.

12. The combination, with a reciprocating die mounted on the frame of the machine, of an intermittently-movable die-carrier having movable dies mounted thereon, means for automatically moving said dies to discharge the work therefrom, and a discharge-chute, substantially as specified.

13. The combination, with a gang of reciprocating dies mounted on the frame of the machine, of an intermittently-moving flexible die-carrier furnished with gangs of dies, a guide $B^3$, for supporting and guiding said die-carrier, and a conveyer K, substantially as specified.

14. The combination, with a gang of reciprocating dies mounted on the frame of the machine, of an intermittently-moving die-carrier furnished with gangs of dies, a conveyer K, and chute K', substantially as specified.

15. The combination, with a die-plate $b$, having guide $b^3$ and recess $b^4$, of die C, having shank $c$ and bevel-corner $c'$, forming with said recess $b^4$ an annular groove to receive the solder ring and can-cap, and an opposing die D, having central portion $d$, provided with bevel-flange $d'$ for closing the solder ring upon the can-cap, substantially as specified.

16. The combination, with a die-plate $b$, having guides $b^3$ and recess $b^4$, of die C, having shank $c$ and bevel-corner $c'$, forming with said recess $b^4$ an annular groove to receive the solder ring and can-cap, and an opposing die D, having central portion $d$, provided with bevel-flange $d'$ for closing the solder ring upon the can-cap, sliding stem $d^2$, and spring $d^3$, substantially as specified.

17. The combination, with a gang of dies, of a reciprocating cross-head upon which they are mounted, a corresponding gang of movable ejector-pins, a cross-bar mounted movably on said cross-head for actuating said ejector-pins, and a movable cam for operating said cross-bar, substantially as specified.

18. The combination, with a die, of a reciprocating cross-head, an ejector-pin and a movable cam for positively operating said ejector-pin to discharge the blank from the die, substantially as specified.

19. The combination, with a die, of a reciprocating cross-head, cams for operating said cross-head, an ejector-pin, and a movable cam or projection $n$, for operating said ejector-pin, substantially as specified.

20. The combination, with a gang of dies D, of cross-head F, cams $F^2$, ejector-pins $d^2$, cross-bar N, and cams or projections $n$ on said cam, and wheels $F^2$, for operating said ejector-pins, substantially as specified.

21. The combination, with die-plate $b$, having guides $b^3$ and recess $b^4$, of die C, having shank $c$ and bevel-corner $c'$, forming with said recess $b^4$ an annular groove to receive the solder ring and can-cap, and an opposing die D, having central portion $d$, provided with bevel-flange $d'$ for closing the solder ring upon the can-cap, sliding stem $d^2$, and spring $d^3$, said sliding stem $d^2$ being hollow and furnished with an extractor-pin $d^7$, substantially as specified.

22. The combination, with a link chain die-carrier B, composed of hinged die-plate links $b$, having guides $b^3$ to receive the die-shanks, of movable dies C, having shanks $c$, and rollers B' $B^2$, said roller B' having a rim $B^3$, against which the shanks of said dies impinge as the link chain passes around said roller, substantially as specified.

23. The combination, with a die mounted on the frame of the machine, of a movable die-carrier and series of dies mounted thereon, the opposing dies having bevel or conical centering surfaces to insure the proper register of the dies on the carrier with the opposing die on the frame, substantially as specified.

JOHN G. HODGSON.
EDWIN NORTON.

Witnesses:
H. M. MUNDAY,
EDMUND ADCOCK.